(12) United States Patent
Maganti et al.

(10) Patent No.: US 11,785,577 B2
(45) Date of Patent: Oct. 10, 2023

(54) AUTOMATIC DEVICE ORIENTATION

(71) Applicant: Apple Inc., Cupertino, CA (US)

(72) Inventors: Anjaneyulu Maganti, San Jose, CA (US); Dhruv Khati, San Jose, CA (US); Krishna Myneni, Santa Clara, CA (US); Shiva Krishna Narra, San Jose, CA (US); Sanjeevi Balasubramanian, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/730,999

(22) Filed: Apr. 27, 2022

(65) Prior Publication Data

US 2023/0080644 A1      Mar. 16, 2023

Related U.S. Application Data

(60) Provisional application No. 63/245,027, filed on Sep. 16, 2021.

(51) Int. Cl.
*H04W 64/00* (2009.01)
*G06F 3/01* (2006.01)
*H01Q 3/00* (2006.01)

(52) U.S. Cl.
CPC ............ *H04W 64/003* (2013.01); *G06F 3/016* (2013.01); *H01Q 3/005* (2013.01)

(58) Field of Classification Search
CPC ........ H04W 64/003; G06F 3/016; H01Q 3/005
See application file for complete search history.

(56) References Cited

U.S. PATENT DOCUMENTS

| | | | |
|---|---|---|---|
| 9,933,507 | B2 | 4/2018 | Afzal |
| 11,190,953 | B2 | 11/2021 | He et al. |
| 2021/0243717 | A1 | 8/2021 | Castagnoli et al. |
| 2021/0273347 | A1 | 9/2021 | Bruhn et al. |
| 2022/0352942 | A1* | 11/2022 | Kalantari et al. .... B64C 39/024 |

\* cited by examiner

*Primary Examiner* — Gerald Johnson
(74) *Attorney, Agent, or Firm* — FLETCHER YODER PC

(57) ABSTRACT

An electronic device determines a position of a communicaiton hub of a wireless network. In response to determining a position of a communication hub of a wireless communication network, the electronic device may operate one or more actuators to move the device to adjust the orientation of the device relative to the communication hub. As such, the mobile communicating device may adjust the orientation of the device relative to the communication hub to provide more reliable and/or more efficient communication of data.

20 Claims, 9 Drawing Sheets

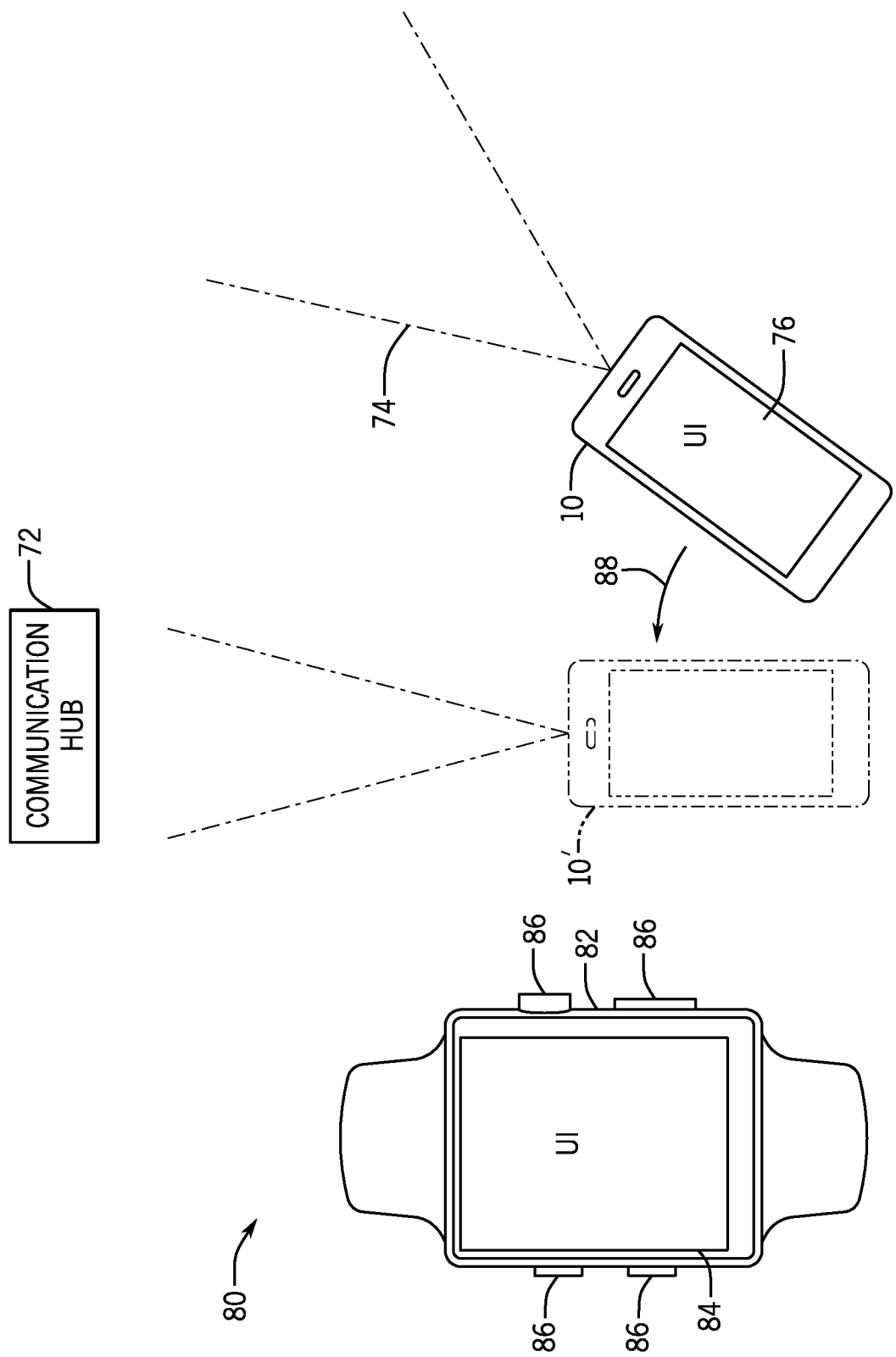

US 11,785,577 B2

AUTOMATIC DEVICE ORIENTATION

CROSS-REFERENCE TO RELATED APPLICATION

This application claims priority to U.S. Provisional Application No. 63/245,027, filed Sep. 16, 2021, entitled "AUTOMATIC DEVICE ORIENTATION," which is hereby incorporated by reference in its entirety for all purposes.

BACKGROUND

The present disclosure relates generally to wireless communication and more specifically to wireless communication performance.

A mobile communication device may utilize different networks, such as cellular networks, Wi-Fi networks, satellite networks, and the like, to transmit and/or receive data. If one or more antennas of the mobile communication device are oriented away from a communication hub of the network, the communication with a network may decrease in performance, or not be performed altogether. As a result, certain operations of the mobile communication device may be undesirably limited.

SUMMARY

In one embodiment, a method includes receiving a position of a communication hub and receiving an orientation of one or more antennas of a device relative to the communication hub based on the position of the communication hub. The method also includes operating an actuator of the device based on the orientation of the one or more antennas. Operating the actuator of the device moves the device to adjust the orientation of the one or more antennas relative to the communication hub.

In another embodiment, one or more non-transitory computer-readable media comprising instructions that, when executed by processing circuitry, are configured to cause the processing circuitry to receive an elapsed time from receiving a previous input from a sensor of a device and cause the device to enter an idle state based on the elapsed time meeting or exceeding a threshold time period. In response to causing the device to enter the idle state, the instructions, when executed by the processing circuitry, are also configured to cause the processing circuitry to receive a position of a communication hub, receive an orientation of one or more antennas of the device relative to the communication hub based on the position of the communication hub, and operate an actuator of the device to move the device to adjust the orientation of the one or more antennas relative to the communication hub.

In yet another embodiment, a method includes receiving a position of a communication hub and receiving an orientation of one or more antennas of a device relative to the communication hub based on the position of the communication hub. The method also includes generating and transmitting a first signal via the one or more antennas indicative of the position of the communication hub, the orientation of the one or more antennas of the device relative to the communication hub, or both. The method also includes receiving a second signal to operate an actuator of the device and operating the actuator of the device based on the second signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 5 is a block diagram of another example communication system including the electronic device of FIG. 1, the communication hub, and a second electronic device that may adjust orientation of the electronic device of FIG. 1, according to embodiments of the present disclosure;

DETAILED DESCRIPTION OF SPECIFIC EMBODIMENTS

This disclosure is directed to improving wireless communications via a mobile communication device. By way of example, when the mobile communication device is outside of a user's reach (e.g., dropped, misplaced, left, and so forth), the mobile communication device may be misaligned with a communication hub of a wireless communication network. As such, communication of data between the communication hub and the mobile communication device may be unreliable and/or inefficient based on the misalignment.

Embodiments herein provide various apparatuses and techniques to enable the mobile communication device to adjust the orientation of the mobile communication device relative to the communication hub (e.g., without a user physically moving the mobile communication device). For example, the mobile communication device may determine a position of the communication hub and may operate one or more actuators of the mobile communication device to move the mobile communication device to improve signal characteristics (e.g., signal power, signal quality, or both) of signals sent and received between the mobile communication device and the communication hub via one or more antennas of the mobile communication device. In particular, the one or more actuators may adjust the orientation based on the determined position of the communication hub to align or better align the antenna 55 with the communication hub. Additionally or alternatively, a second device may instruct the mobile communication device to operate the actuators to adjust the orientation relative to the communication hub. In another instance, the mobile communication device may have a broken, cracked, or otherwise inoperable display. As such, the mobile communication device may operate the actuators to provide an indication of the position of the communication hub to a user.

Figure 1:
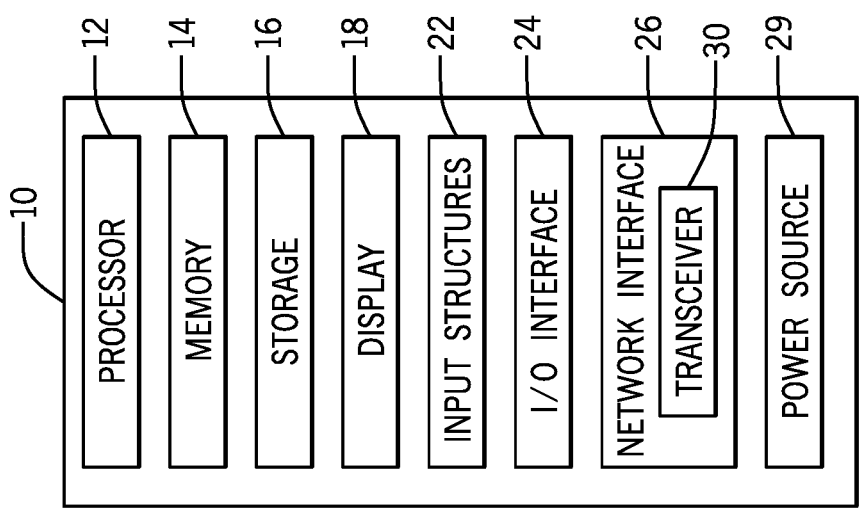
FIG. 1 is a block diagram of an electronic device, according to embodiments of the present disclosure.

FIG. 1 is a block diagram of an electronic device or mobile communication device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, and so on. In particular, the network interface 26 may include, for example, one or more interfaces for using a cellular communication standard of the 5G specifications that include the millimeter wave (mmWave) frequency range (e.g., 24.25-300 gigahertz (GHz)). The network interface 26 can further include provisions for communicating via terrestrial or non-terrestrial networks. Non-terrestrial networks can include communications or a connection via a satellite network. In at least one example, this can include non-terrestrial network (NTN) communication according to one of the 3GPP family of wireless communication standards.

The network interface 26 of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating data using one of the aforementioned networks. The power source 29 of the electronic device 10 may include any suitable source of power, such as a rechargeable lithium polymer (Li-poly) battery and/or an alternating current (AC) power converter.

Figure 2:
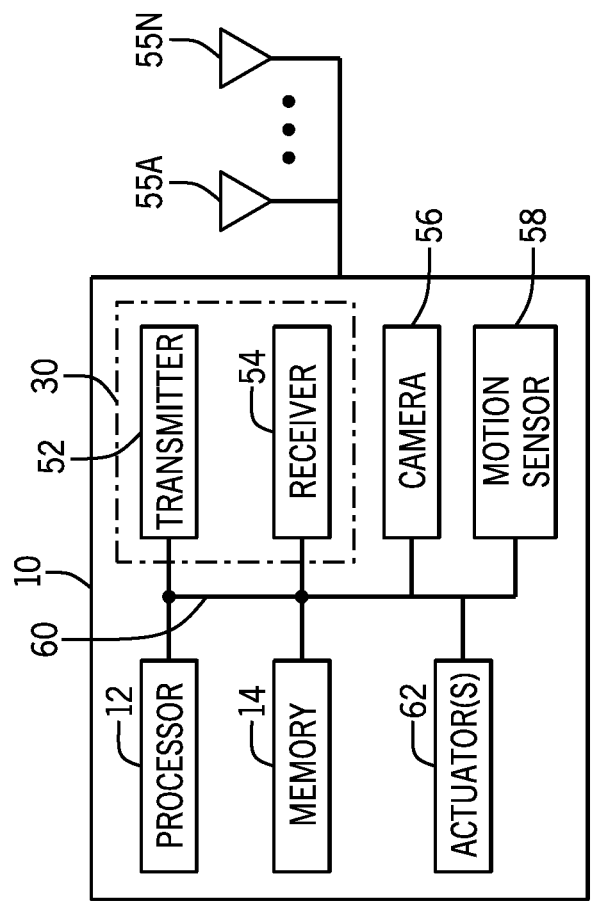
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. Additionally or alternatively, the antennas 55A-55N may include one or more steerable antennas, one or more fixed antennas, or a combination thereof. For example, the steerable antennas may adjust (e.g., rotate) a direction of an associated beam. In some embodiments, the antennas 55A-55N may receive data indicative of a position of one or more communication hubs of a first wireless communication network. For example, the antennas 55A-55N may receive data indicative of a navigation system (e.g., a global positioning system, BeiDou navigation system, global navigation system, and so forth), coordinates of a base station, navigation system coordinates of a terrestrial station, orbital elements (e.g., two-line elements) of an orbiting object, ephemeris data, or any combination thereof.

The antennas 55A-55N may be communicatively coupled to the one or more processors 12 and may transmit the received data to the one or more processors 12. In some embodiments, the one or more processors 12 may determine a position of one or more communication hubs based on the received data. For example, the one or more processors 12 may process the data to determine global positioning system coordinates of a base station, determine a position of a non-terrestrial base station based on a two-line element set and/or ephemeris data, and so forth. For example, the one or more processors 12 may determine a current time and may determine a current position of a satellite based on the current time and the ephemeris data and/or the two-line element set.

The electronic device 10 (e.g., the transceiver 30) may also request for receipt of certain information (e.g., navigation system coordinates, ephemeris data, orbital elements, two-line elements) via a wireless communication network. By way of example, the electronic device 10 (e.g., the transceiver 30) may request for content delivery network (CDN) information to be transmitted by a communication hub to the electronic device 10 via the communication network. In certain embodiments, the electronic device 10 may utilize the CDN information to initiate communication with the communication hub or another communication hub not associated with utilizing the CDN information (such as a WiFi router, a base station, and so on). For instance, the CDN information may include an identifier, a frequency channel, allowed areas of operation, and so forth, that may be used to determine availability of the communication hub for communicating with the electronic device 10 (e.g., based on the geographic location of the electronic device 10 and/or a location of the communication hub). Thus, it may be desirable for the electronic device 10 to periodically request updated CDN information from the network while the network is accessible to enable the electronic device 10 to communicate with the communication hub. In certain embodiments, the CDN information may be stored in the memory 14 and/or the storage 16 of the electronic device 10 and may be updated periodically with the updated CDN information.

The electronic device 10 may include multiple transmitters, multiple receivers, multiple transceivers, and/or multiple antennas as suitable for various communication standards. For example, the electronic device 10 may include a first transceiver to send and receive messages using a first wireless communication network, a second transceiver to send and receive messages using a second wireless communication network, and a third transceiver to send and receive messages using a third wireless communication network, though any or all of these transceivers may be combined in a single transceiver. In some embodiments, the transmitter 52 and the receiver 54 may transmit and receive information via other wired or wireline systems or means.

The electronic device 10 may also include one or more cameras or image or light sensors (e.g., as part of the input structures 22). The one or more cameras or image or light sensors (collectively referred to as "a camera 56" herein) may capture images or determine amounts of light surrounding the electronic device 10. In some embodiments, the camera 56 may include a front-facing camera (e.g., disposed on a display surface of the electronic device 10 having the display 18) and/or a rear-facing camera (e.g., disposed on a base or back surface, opposite the display surface, of the electronic device 10).

The electronic device 10 may include one or more motion sensors 58 (e.g., as part of the input structures 22). The one or more motion sensors (collectively referred to as "a motion sensor 58" herein) may include an accelerometer, gyroscope, gyrometer, and the like, that detect or facilitate determining an orientation (e.g., including pitch, yaw, roll, and so on) and/or motion of the electronic device 10. In certain embodiments, the motion sensor 58 may generate and/or may transmit data (e.g., a signal) indicative of an orientation (e.g., a current orientation) of the electronic device 10 and/or may generate and/or may transmit data (e.g., a signal) indicative of motion (e.g., translational motion, rotational motion, and so on) of the electronic device 10. The motion sensor 58 may include processing circuitry and may process data to determine the orientation and/or the motion of the electronic device 10. Additionally or alternatively, the motion sensor 58 may generate and/or may transmit data (e.g., a signal) indicative of the orientation and the motion of the electronic device 10 to the processor 12. The one or more processors 12 may receive the data, may process the data, and/or may determine the orientation and/or the motion of the electronic device 10 based on the data from the motion sensor 58. In some embodiments, the one or more processors 12 may determine an elapsed time from a previous signal from the motion sensor 58. For example, the one or more processors 12 may determine whether the elapsed time meets or exceeds a threshold time period (e.g., 30 seconds, 1 minute, 2 minutes, and so forth). In certain embodiments, the one or more processors 12 may determine that the electronic device 10 is in an idle state and/or may place the electronic device 10 in the idle state in response to the elapsed time meeting or exceeding the threshold time period. The one or more processors 12 may instruct the electronic device 10 to exit the idle state (e.g., enter an active state) in response to receiving a signal from the motion sensor 58.

Additionally or alternatively, the one or more processors 12 may determine elapsed times for any number of signals for any number of corresponding sensors (e.g., motion sensors, input structures, input interfaces, touch screen, capacitive sensors, push buttons, and so forth) of the electronic device 10. In some embodiments, each sensor may have a corresponding threshold time period. In certain embodiments, the one or more processors 12 may determine that the electronic device 10 is in an idle state and/or may place the electronic device in the idle state in response to any number of the elapsed times (e.g., a threshold number, all) meeting or exceeding the corresponding threshold time periods. Additionally or alternatively, the one or more processors 12 may determine elapsed times for any number of signals associated with the antenna 55. In some embodiments, the one or more processors 12 may determine an elapsed time from a previous signal from the antenna 55. For example, the one or more processors 12 may determine an elapsed time from a previous signal associated with a second electronic device. The second electronic device may include any number of similar components as the electronic device 10 in FIG. 1. For example, the second electronic device may include, among other things, a processor, a memory, nonvolatile storage, a display, input structures, an I/O interface, a network interface, a power source, a transceiver, a camera, a motion sensor, an actuator, one or more antennas, and so forth. In some embodiments, the one or more processors 12 may determine elapsed times for any number of signals for any number of additional electronic devices. In some embodiments, each additional electronic device may have a corresponding threshold time period. In certain embodiments, the one or more processors 12 may determine that the electronic device 10 is in an idle state and/or may place the electronic device in the idle state in response to any number of the elapsed times (e.g., a threshold number, all) meeting or exceeding the threshold time periods. Additionally or alternatively, the one or more processors 12 may determine that the electronic device 10 is in an idle state and/or may place the electronic device 10 in the idle state in response to any number of the elapsed times associated with the sensors of the electronic device and/or any number of the elapsed times associated with the additional electronic devices meeting or exceeding the threshold time periods.

The second electronic device may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. Additionally or alternatively, the one or more processors 12 may determine a distance between the second electronic device and the electronic device 10. For example, the one or more processors 12 may determine whether the distance meets or exceeds a threshold distance (e.g., 0.5 meters, 1 meter, 2 meters, 5 meters, and so forth). In certain embodiments, the one or more processors 12 may determine that the electronic device 10 is in an idle state and/or may place the electronic device 10 in the idle state in response to the determined distance meeting or exceeding the threshold distance. The one or more processors 12 may instruct the electronic device 10 to exit the idle state in response to receiving a signal from the second electronic device and/or in response to determining the distance between the second electronic device and the electronic device 10 falls within the threshold distance.

The electronic device 10 may also include one or more actuators 62. The one or more actuators (collectively referred to as "an actuator 62" herein) may include a haptic actuator, a resonant actuator, an eccentric rotating mass actuator, a piezoelectric actuator, and the like, that facilitate or generate vibration and/or motion (e.g., longitudinal motion, lateral motion, rotational motion, and so on) of the electronic device 10. In certain embodiments, operation of the actuator 62 may cause the electronic device 10 to move (e.g., translational motion, rotational motion, and so forth).

As illustrated, the various components of the electronic device 10 may be coupled together by a bus system 60. The bus system 60 may include a data bus, for example, as well as a power bus, a control signal bus, and a status signal bus, in addition to the data bus. The components of the electronic device 10 may be coupled together or accept or provide inputs to each other using some other mechanism.

Embodiments herein provide various apparatuses and techniques to improve communication of data. As an example, the electronic device 10 may utilize the actuators 62 to adjust the orientation of the electronic device 10 relative to a communication hub of a wireless communication network to improve signal characteristics (e.g., signal power, signal quality, or both) of signals sent and received between the electronic device 10 and the communication hub via the antenna 55. In some embodiments, the actuators 62 may adjust the orientation based on a determined position of the communication hub to align or better align the antenna 55 with the communication hub to provide more reliable and/or more efficient communication of data.

Figure 3:
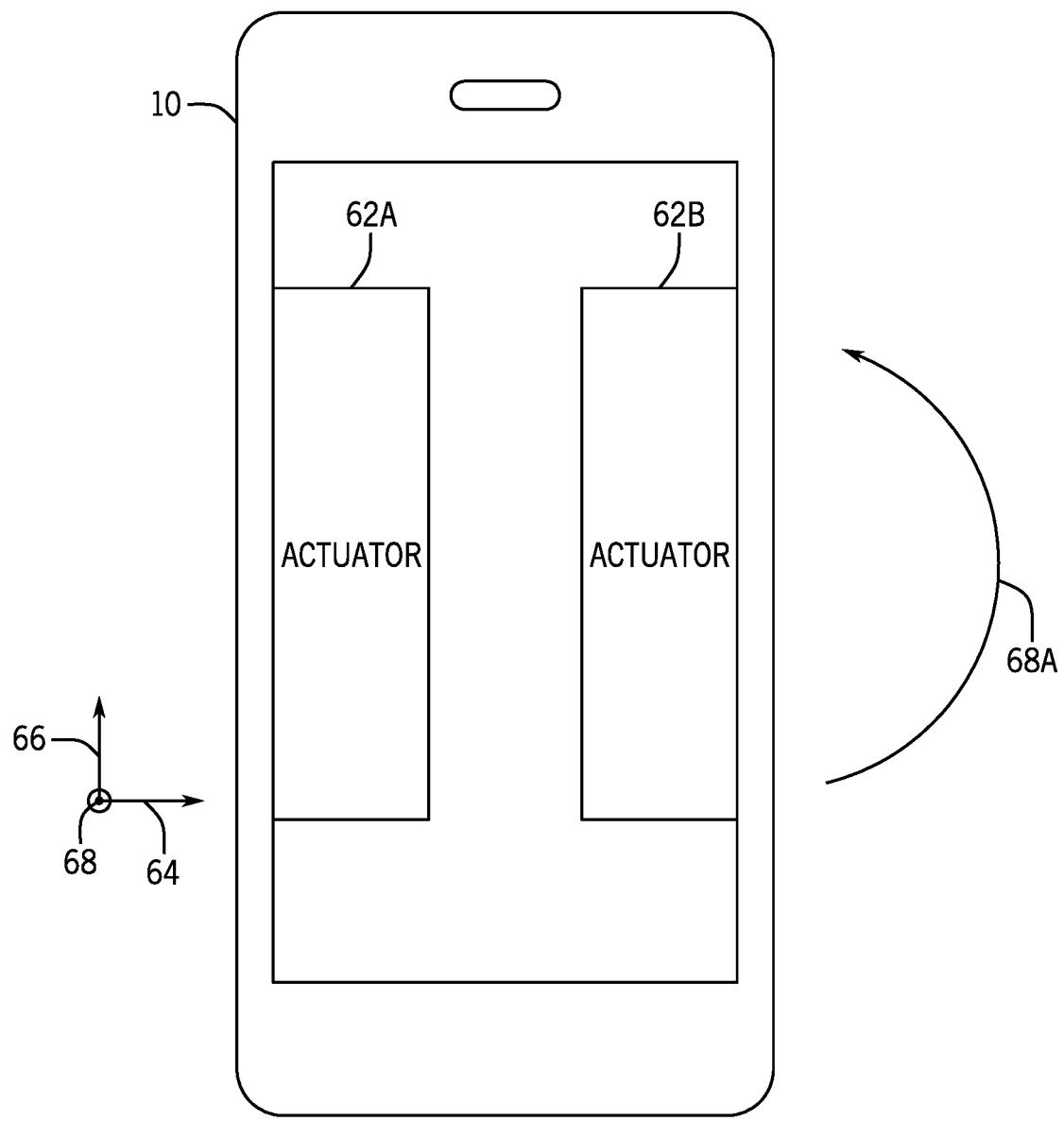
FIG. 3 is a schematic diagram of the electronic device of FIG. 1, according to embodiments of the present disclosure.

With the preceding in mind, FIG. 3 is a schematic diagram of the electronic device 10, according to embodiments of the present disclosure. As described herein, the electronic device 10 may include one or more actuators, such as first actuator 62A and second actuator 62B. The actuators 62A, 62B may move the electronic device 10 in any number of degrees of freedom. For example, the first actuator 62A, the second actuator 62B, or a combination of the actuators 62A, 62B, may move the electronic device 10 along a lateral axis 64 of the electronic device 10, along a longitudinal axis 66 of the electronic device 10, and/or may rotate the electronic device 10 about a depth or vertical axis 68 (e.g., may rotate the electronic device 10 in the direction 68A). In some embodiments, each actuator 62A, 62B may generate vibrations in a single degree of freedom. For example, each actuator 62A, 62B may generate oscillating forces along a corresponding axis of the actuator. Additionally or alternatively, each actuator 62A, 62B may generate vibrations (e.g., oscillating forces) in different directions. For example, the first actuator 62A may generate vibrations along the lateral axis 64 and the second actuator 62B may generate vibrations at any angle relative to the lateral axis 64 (e.g., along the longitudinal axis 66). While two actuators 62A, 62B are illustrated in FIG. 3, the electronic device 10 may include any number of actuators and each actuator may generate vibrations along one or more corresponding axes of each actuator. In some embodiments, any number of actuators may generate vibrations along the same axis, such as along lateral axis 64.

Figure 4B:
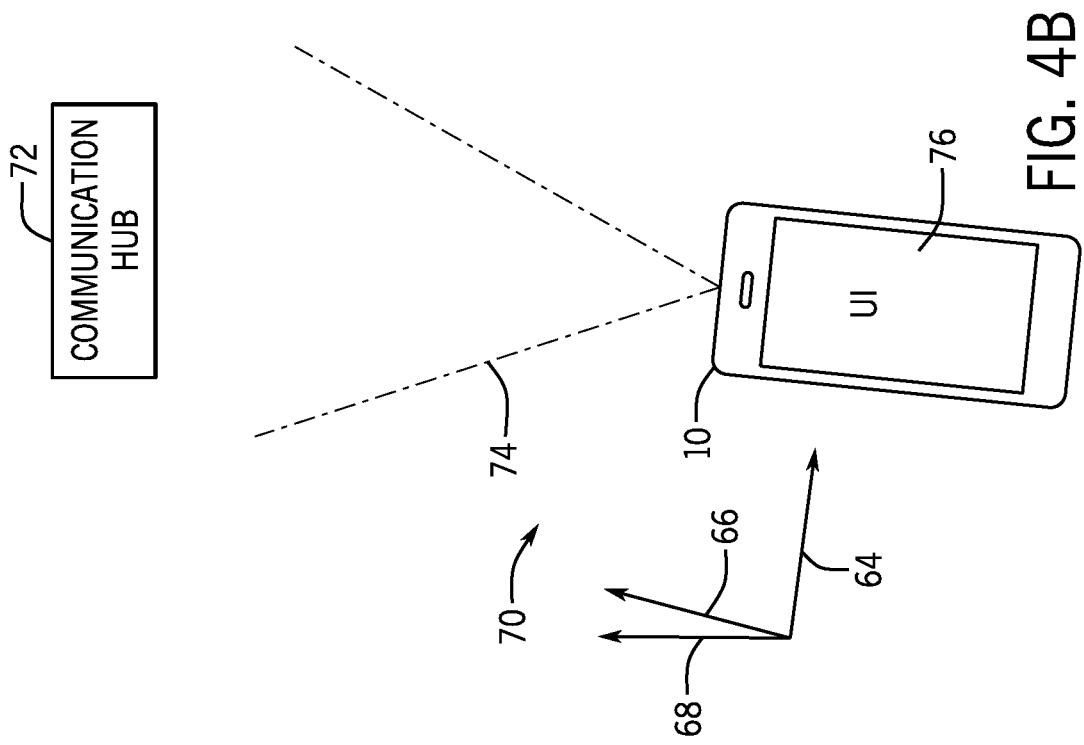
FIG. 4B is a schematic diagram of the example communication system including the electronic device of FIG. 1 having a second orientation relative to the communication hub, according to embodiments of the present disclosure.
Figure 4A:
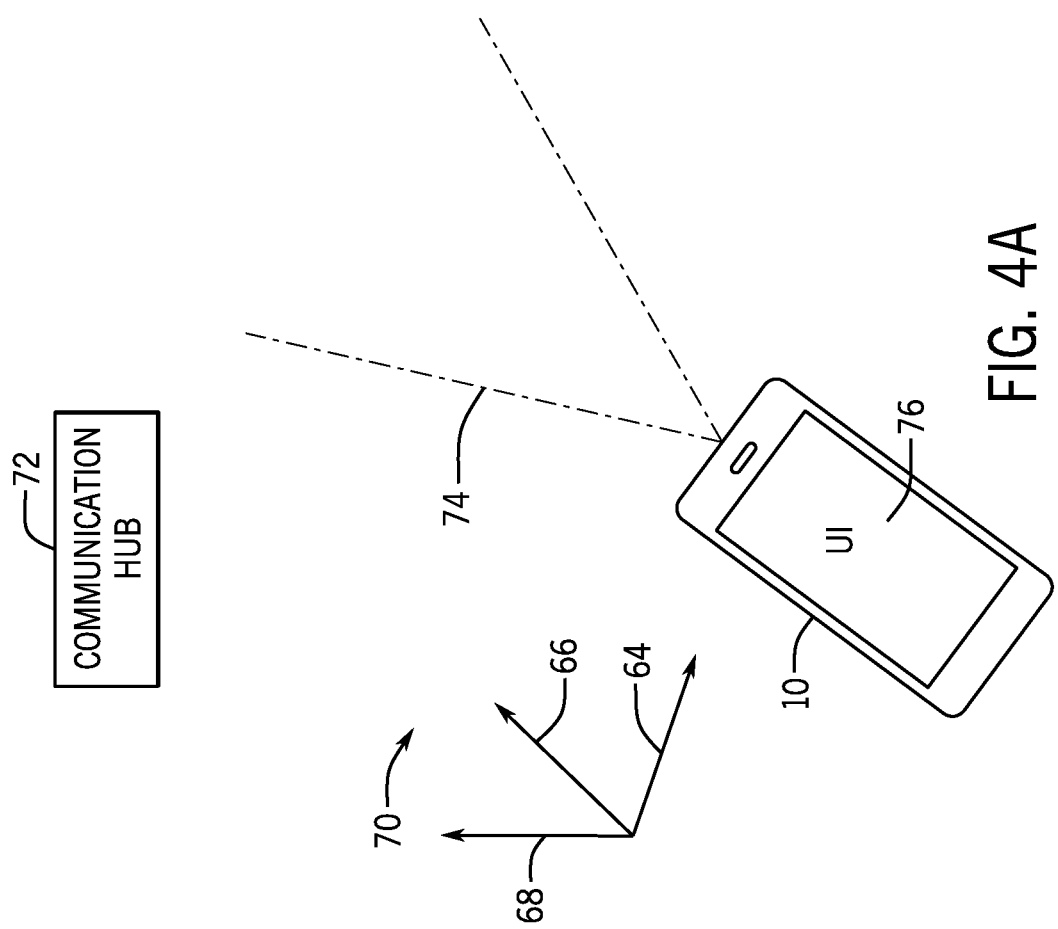
FIG. 4A is a schematic diagram of an example communication system including the electronic device of FIG. 1 having a first orientation relative to a communication hub; according to embodiments of the present disclosure.

With the preceding in mind, FIG. 4A is a block diagram of an embodiment of a communication system 70 including the electronic device 10 of FIG. 1, according to embodiments of the present disclosure. The system 70 may also include a communication hub 72. The communication hub 72 may establish or facilitate implementing a respective network for communicating data. As an example, the communication hub 72 may include any combination of terrestrial base stations (base stations), non-terrestrial base stations such as a satellite (e.g., a low earth orbit, a medium earth orbit, a geosynchronous equatorial orbit, a high earth orbit), cellular networks, a wireless carrier, Wi-Fi networks, NTN communication, satellite networks, and so forth. The communication hub 72 may be communicatively coupled to the electronic device 10 and may send data to or receive data from the electronic device 10 via the associated network. For example, the communication hub 72 may establish a communication channel with the electronic device 10 via the associated network, receive requests for data from the electronic device 10 via the associated network, and/or send data to the electronic device 10 via the associated network based on the requests. Additionally or alternatively, the communication hub 72 may be communicatively coupled to another entity (e.g., another electronic device, a ground station, a call center), which may send data to or receive data from the electronic device 10 via the associated network. For instance, the other entity may establish a communication channel with the electronic device 10 via the associated network, receive requests for data from the electronic device 10 via the associated network, and/or send data to the electronic device 10 via the associated network based on the requests. In some embodiments, the communication hub 72 may be implemented as a satellite and communicatively coupled to the electronic device 10, which may be implemented as user equipment, and may send data to or receive data from the user equipment via a satellite network.

The one or more antennas 55 of the electronic device 10 may generate a radiation pattern 74 corresponding to a directional dependence of the one or more antennas 55 for receiving and/or transmitting signals via the network. In certain embodiments, the radiation pattern 74 may correspond to a three-dimensional shape extending outward from the one or more antennas 55. In some embodiments, the radiation pattern 74 may include a beamformed, directional beam. Signals transmitted from the electronic device 10 may radiate out from the one or more antennas 55 in the shape of the radiation pattern 74. In some embodiments, the radiation pattern 74 may be substantially centered about the longitudinal axis 66 of the electronic device 10. For example, the shape of the radiation pattern 74 may extend along the longitudinal axis 66 of the electronic device 10. The one or more antennas 55 may receive and/or transmit signals to the communication hub 72 via the network. In certain embodiments, the electronic device 10 may include processing circuitry (e.g., one or more processors 12) to process signals received via the network and/or generate signals transmitted via the network. Additionally or alternatively, the processing circuitry 12 may process signals to determine one or more signal characteristics associated with the signals. For example, the one or more signal characteristics may be indicative of a quality (e.g., a signal-to-noise ratio, a signal-to-interference ratio, a signal-to-noise-plus-interference ratio, and so forth) and/or a signal strength (e.g., a received signal strength indicator (RSSI), a reference signal received power (RSRP) measurement, a received channel power indicator (RCPI), and so forth) of the received and/or transmitted signal at, for example, the one or more antennas 55.

In the illustrated embodiment, the electronic device 10 may be disposed in a first orientation relative to the communication hub 72. For example, the radiation pattern 74 may be disposed in a first orientation relative to the communication hub 72 such that the electronic device 10 may not be able to communicate (e.g., receive and/or transmit signals) with the communication hub 72 in a reliable or efficient manner. This may be because the radiation pattern 74 may be disposed at an angle relative to the communication hub 72, and thus not be aligned or not aligned sufficiently with the communication hub 72. For example, the communication hub 72 may be disposed at an angle relative to the longitudinal axis 66 in the first orientation. Additionally or alternatively, the communication hub 72 may be disposed at an angle relative to the longitudinal axis 66 equal to or greater than a threshold angle (e.g., 45 degrees, 60 degrees, 90 degrees, 100 degrees, and so forth). For example, when the angle between the communication hub 72 and the longitudinal axis 66 is equal to or greater than the threshold angle, communication between the communication hub 72 and the electronic device 10 may be reduced (e.g., unreliable, inefficient, and so forth) and/or may fail.

In some embodiments, the display 18 of the electronic device 10 may include an input structure 22, such as a touch screen, which may facilitate user interaction with a user interface 76 of the electronic device 10. The user interface 76 may include an indication of one or more signal characteristics (e.g., a signal strength and/or quality) for receiving and/or transmitting signals via the network. Additionally or alternatively, the user interface 76 may display the position of the communication hub 72 and/or an orientation of the electronic device 10 and/or the antenna 55 relative to the communication hub 72 to, for example, assist a user in orienting the electronic device towards the communication hub 72 (e.g., to better align the antenna 55 toward the communication hub 72). For example, the one or more processors 12 may determine the position of the communication hub 72 and/or the orientation of the electronic device 10 and/or the antenna 55 relative to the communication hub 72 and may instruct the display 18 to generate the user interface 76 including an indication of the position of the communication hub 72 and/or the orientation of the electronic device 10 and/or the antenna 55 relative to the communication hub 72. In some embodiments, the user interface 76 may display one or more notifications instructing a user to orient the electronic device 10 towards the communication hub 72. For example, the user interface 76 may display a notification to rotate the electronic device 10 relative to the communication hub 72.

With the preceding in mind, FIG. 4B is a block diagram of the communication system 70 including the electronic device 10 in a second orientation relative to the communication hub 72, according to embodiment of the present disclosure. In particular, as a result of performing the disclosed techniques, the electronic device 10 may be positioned in the second orientation. The radiation pattern 74 may be oriented towards the communication hub 72 when the electronic device 10 is in the second orientation. The electronic device 10 may be moved in any number of degrees of freedom (e.g., translation and/or rotation) to orient the radiation pattern 74 towards the communication hub 72. For example, the electronic device 10 may be rotated about the lateral axis 64 and/or the vertical axis 68 to orient the radiation pattern 74 towards the communication hub 72. In certain embodiments, the actuator 62 of the electronic device 10 may operate to orient the electronic device 10 and/or the radiation pattern 74 towards the communication hub 72. Accordingly, the user interface 76 may indicate one or more signal characteristics (e.g., the signal strength or quality) for the communication network 70 is greater in the second orientation of FIG. 4B than the first orientation of FIG. 4A.

In the illustrated embodiment, the electronic device 10 may be disposed in the second orientation relative to the communication hub 72 and may be disposed at a second angle relative to the communication hub 72 in the second orientation. In certain embodiments, the radiation pattern 74 may at a second angle relative to the communication hub 72 in the second orientation. For example, the communication hub 72 may be disposed at a second angle relative to the longitudinal axis 66 in the second orientation. Additionally or alternatively, the communication hub 72 may be disposed at an angle relative to the longitudinal axis 66 less than the threshold angle (e.g., 45 degrees, 60 degrees, 90 degrees, 100 degrees, and so forth). For example, when the angle between the communication hub 72 and the longitudinal axis 66 is less than the threshold angle, communication between the communication hub 72 and the electronic device 10 may be possible (e.g., reliable, efficient, greater than a threshold signal characteristic, and so forth) and/or may be successful. In some embodiments, one or more of the signal characteristics may meet or exceed a corresponding threshold signal characteristic value in the second orientation.

Certain communication operating characteristics (e.g., a transmission power, a receiving power, a bandwidth, a link budget, an uplink rate, a downlink rate, an availability of a network) of the network associated with the communication hub 72 may be limited or reduced when the electronic device 10 is in the first orientation of FIG. 4A when compared to when the electronic device is in the second orientation of FIG. 4B. For example, the link budget or the receiving signal strength associated with data communication via the communication hub 72 may be substantially lower or more limited (e.g., below a threshold level) in the first orientation than the link budget associated with data communication via the communication hub 72 in the second orientation. Thus, in the first orientation, the network may be a poorer performing network with respect to the network when the electronic device 10 is in the second orientation, and communicating data via the network may be more stable, efficient, and/or reliable in the second orientation than communicating data in the first orientation. For at least these reasons, it may be more desirable for the electronic device 10 (and, as a result, the antenna 55 and/or the radiation pattern 74) to be oriented in the second orientation than the first orientation when using the network for communication with the communication hub 72.

With the preceding in mind, FIG. 5 is a block diagram of an embodiment of another communication system 80, according to embodiments of the present disclosure. The system 70 may also include the communication hub 72. The communication hub 72 may establish or facilitate implementing a respective network for communicating data. In certain embodiments, the communication hub 72 may be communicatively coupled to another entity (e.g., a second electronic device 82, a ground station, a call center), which may send data to or receive data from the electronic device 10 via the associated network. For instance, the second electronic device 82 may establish a communication channel with the electronic device 10 via the associated network, receive requests for data from the electronic device 10 via the associated network, and/or send data to the electronic device 10 via the associated network based on the requests. In some embodiments, the second electronic device 82 may establish a communication channel with the electronic device 10 via a second network, receive requests for data from the electronic device 10 via the second network, and/or or send data to the electronic device 10 via the second network based on the requests.

The second electronic device 82 may include any number of similar components as the electronic device 10 in FIG. 1. For example, the second electronic device 82 may include, among other things, a processor, a memory, nonvolatile storage, a display, input structures 86, an I/O interface, a network interface, a power source, a transceiver, a camera, a motion sensor, an actuator, one or more antennas, and so forth. The input structures 86 of the second electronic device 82 may enable a user to interact with the second electronic device 82 (e.g., pressing a button, turning a knob). In certain embodiments, the display of the second electronic device 82 may facilitate users to view images generated on the second electronic device 82. In some embodiments, the display may include a touch screen, which may facilitate user interaction with a user interface 84 of the second electronic device 82.

The second electronic device 82 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices.

In some embodiments, the display of the second electronic device 82 may facilitate user interaction with the user interface 84 of the second electronic device 82. The user interface 84 may include an indication of a signal characteristic for receiving and/or transmitting signals via the network. Additionally or alternatively, the user interface 84 may display the position of the communication hub 72 and/or an orientation of the second electronic device 82 relative to the communication hub 72 to assist a user in orienting the second electronic device towards the communication hub 72. For example, the one or more processors 12 may determine the position of the communication hub 72 and/or the orientation of the second electronic device 82 relative to the communication hub 72 and may instruct the display to generate the user interface 84 including an indication of the position of the communication hub 72 and/or the orientation of the second electronic device 82 relative to the communication hub 72. In some embodiments, the user interface 84 may display one or more notifications instructing a user to orient the second electronic device 82 towards the communication hub 72. For example, the user interface 84 may display a notification to rotate the second electronic device 82 relative to the communication hub 72.

Additionally or alternatively, the second electronic device 82 may facilitate control of the actuators of the electronic device 10 to adjust the orientation of the electronic device 10. For example, the second electronic device 82 may generate and/or may transmit signals to instruct the electronic device 10 to operate the actuators. The second electronic device 82 may communicate with the electronic device 10 via the network of the communication hub 72 and/or any other suitable communication network. For instance, the second electronic device 82 may communicate with the electronic device 10 via a device-to-device or peer-to-peer network, such as an ultra-wideband (UWB) network, a BLUETOOTH® network, a near field communication network, and so on, which may be different than the network of the communication hub 72 (e.g., a cellular network, a satellite network, and so on). In some embodiments, the input structures 86 of the second electronic device 82 may facilitate generation of the signals to instruct the electronic device 10 to operate the actuators. For example, the input structure 86 (e.g., a control knob, a graphically displayed control provided on the user interface 84 of the second electronic device 82) may be turned in a first direction (e.g., counterclockwise) and a corresponding signal may be generated and/or transmitted to the electronic device 10 to operate the actuators to rotate the electronic device 10 in a direction 88 (e.g., counterclockwise). Similarly, the input structure may be turned in a second direction (e.g., clockwise) and a corresponding signal may be generated and/or transmitted to the electronic device 10 to operate the actuators to rotate the electronic device 10 in a direction opposite the direction 88 (e.g., clockwise). Additionally or alternatively, pressing an input structure 86 on a first side of the second electronic device 82 may cause rotation of the electronic device 10 in the direction 88 and/or may cause translational movement of the electronic device 10. Likewise, pressing an input structure 86 on a second side of the second electronic device 82 may cause rotation of the electronic device in a second direction opposite the direction 88.

Certain communication operating characteristics (e.g., a transmission power, a receiving power, a bandwidth, a link budget, an uplink rate, a downlink rate, an availability of a network) of the network associated with the communication hub 72 may be limited or reduced when the electronic device 10 is in the first orientation (e.g., as shown in FIG. 4A) when compared to when the electronic device is in the second orientation 10' (e.g., as shown in FIG. 4B). For example, the link budget or the receiving signal strength associated with data communication via the communication hub 72 may be substantially lower or more limited in the first orientation than the link budget associated with data communication via the communication hub 72 in the second orientation 10'. Thus, in the first orientation, the network may be a poorer performing network with respect to the network when the electronic device 10 is in the second orientation 10', and communicating data via the network may be more stable, efficient, and/or reliable in the second orientation 10' than communicating data in the first orientation. For at least these reasons, it may be more desirable for the electronic device 10 to be oriented in the second orientation 10' than the first orientation when using the network for communication with the communication hub 72.

In certain embodiments, the electronic device 10 may generate and/or may transmit a signal indicative of a position of the communication hub 72 and/or an orientation of the electronic device 10 relative to the communication hub 72. For example, the electronic device 10 may generate and/or may transmit the signal to the second electronic device via the communication network associated with the communication hub, a second communication network, or both. In some embodiments, the signal may instruct the second electronic device 82 to generate the user interface 84 and to display the position of the communication hub 72 and/or the orientation of the electronic device 10 relative to the communication hub 72. Additionally or alternatively, the electronic device 10 may generate and/or may transmit a signal indicative of one or more signal characteristics associated with a signal between the communication hub 72 and the electronic device 10 via the network.

Each of FIGS. 6-9 described below illustrates a respective method for communicating data. Any suitable device (e.g., a controller) that may control components of the electronic device 10, such as the processor 12, may perform the methods. In some embodiments, each of the methods may be implemented by executing instructions stored in a tangible, non-transitory, computer-readable medium, such as the memory 14 or storage 16, using the processor 12. For example, the methods may be performed at least in part by one or more software components, such as an operating system of the electronic device 10, one or more software applications of the electronic device 10, and the like. While each of the methods is described using steps in a specific sequence, additional steps may be performed, the described steps may be performed in different sequences than the sequence illustrated, and certain described steps may be skipped or not performed altogether. Further still, the steps of any of the respective methods may be performed in parallel with one another, such as at the same time, and/or in response to one another.

Figure 6:
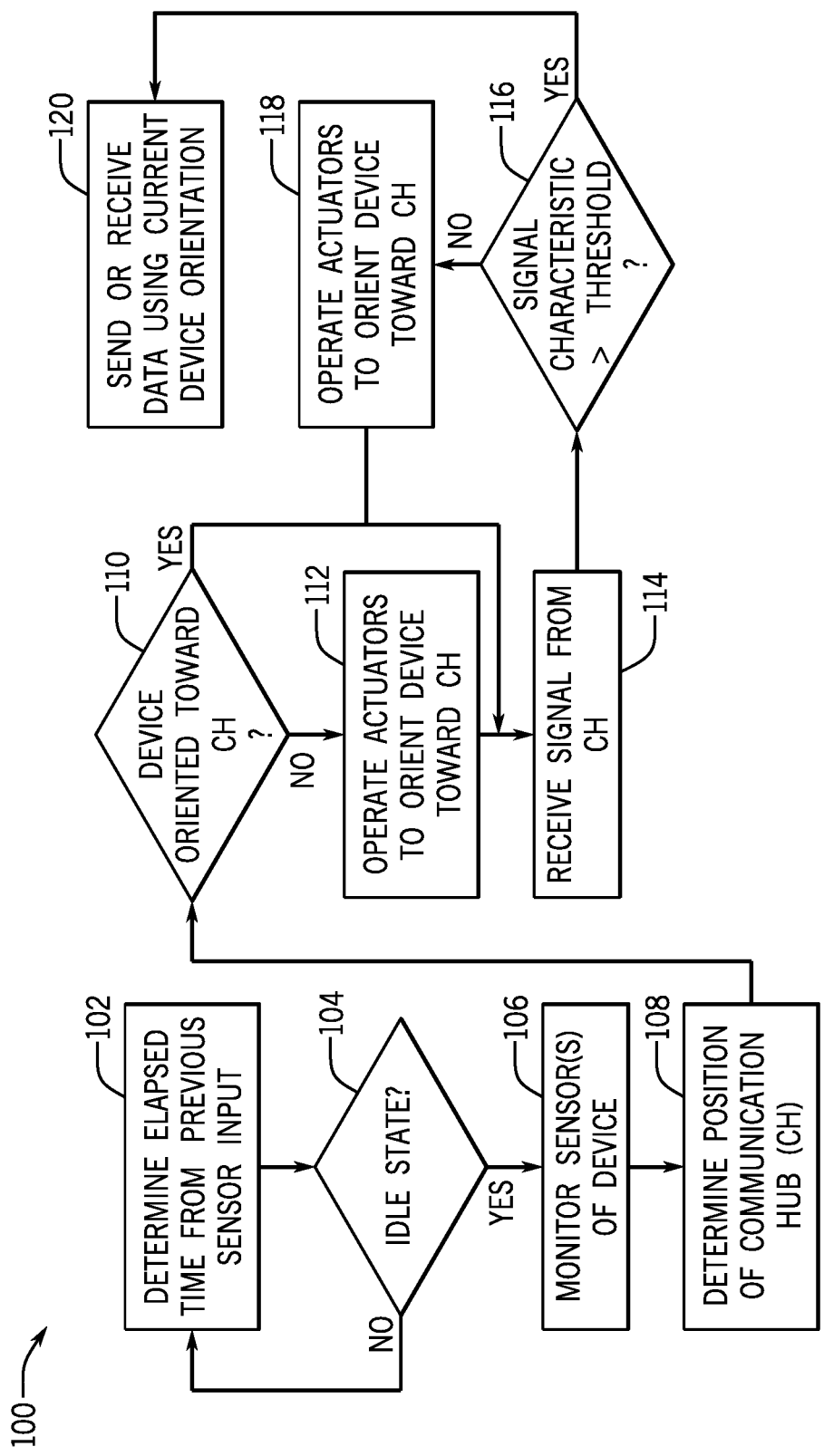
FIG. 6 is a flowchart of a method for orienting the electronic device of FIG. 1 towards the communication hub, according to embodiments of the present disclosure.

FIG. 6 is a flowchart of an embodiment of a method 100 for orienting (e.g., automatically orienting, without user or manual interaction) the electronic device 10 towards the communication hub, according to embodiments of the present disclosure. At block 102, the processor 12 may receive an elapsed time from a previous sensor input or other indication of active use of the electronic device 10. For example, the processor 12 may determine the elapsed time from a previous input from the motion sensor 58, the camera 56, the input structures 22, and so on. At block 104, the processor 12 may determine whether the electronic device 10 is in the idle state. In certain embodiments, the processor 12 may determine whether the elapsed time meets or exceeds a threshold time period. For example, the processor 12 may determine and/or may place the electronic device 10 in the idle state in response to determining that the elapsed time meets or exceeds the threshold time period. Alternatively, the processor 12 may determine and/or may place the electronic device in a non-idle state (e.g., an active state) in response to determining that the elapsed time falls below the threshold time period. Additionally or alternatively, the processor 12 may determine At block 106 (YES path of block 104), in response to determining that the device 10 is in the idle state, the processor 12 may monitor one or more sensors (e.g., the motion sensor 58, the camera 56, the input structures 22, and so on) of the electronic device 10. By way of example, the processor 12 may cause the electronic device 10 to exit the idle state in response to receiving a sensor signal from any sensor of the one or more sensors. In response to determining that the device is not in the idle state (NO path of block 104), the processor 12 may return to block 102 to determine the elapsed time from the previous sensor input.

At block 108, the processor 12 may determine a position of the communication hub 72. For instance, the processor 12 may retrieve the CDN information from the memory 14 and/or the storage 16 and may determine the position of the communication hub 72 based on the CDN information (e.g., navigation system information, orbital element information, ephemeris data, and so forth). At block 110, the processor 12 may determine whether the electronic device 10 is oriented towards the communication hub 72 based on the determined position of the communication hub 72. For example, the processor 12 may determine whether the antennas 55 and/or a radiation pattern 74 that would be emitted by the antennas 55 is oriented towards the communication hub 72. Additionally or alternatively, the processor 12 may determine whether the orientation of the electronic device 10 relative to the communication hub 72 meets or exceeds a threshold angle. In response to determining that the orientation of the electronic device 10 relative to the communication hub 72 falls within the threshold angle (YES path of block 110), the processor 12 may continue to block 114. At block 112 (NO path of block 110), in response to determining that the orientation of the electronic device 10 relative to the communication hub 72 meets or exceeds the threshold angle, the processor 12 may operate the actuators 62 to orient the electronic device toward the communication hub 72. At block 114, the processor 12 may receive a signal from the communication hub 72. For example, the antennas 55A-55N may receive a signal from the communication hub 72 via the communication network and may transmit the signal to the processor 12.

At block 116, the processor 12 may determine whether one or more signal characteristics associated with the received signal satisfy one or more signal characteristic threshold values. For example, the processor 12 may determine one or more signal characteristics (e.g., a signal quality, a signal power, and so on) for the received signal and may compare the one or more signal characteristics to corresponding signal characteristic threshold values. Additionally or alternatively, the processor 12 may compare signal characteristics of the received signal to stored signal characteristic values from previously received signals from the communication hub 72. For example, the processor 12 may receive any number of signals from the communication hub 72 during operation of the actuators, may process the previously received signals to generate corresponding signal characteristics, and may store the previously received signals and corresponding signal characteristics in the memory 14. The processor 12 may retrieve the stored signal characteristics from the memory 14 and may compare the stored signal characteristics with new signal characteristics associated with the received signal.

At block 118 (NO path of block 116), in response to determining that the new signal characteristics fall within the signal characteristic threshold values, the processor 12 may operate the actuators to orient device toward the communication hub 72. For example, the processor 12 may store an associated orientation of the electronic device 10 relative to the communication hub 72 for previously received signals. Accordingly, the processor 12 may compare signal characteristics associated with the previously received signals to the signal characteristics associated with the newly received signal and may determine an increased signal characteristic (e.g., a maximum signal characteristic, a peak signal characteristic) associated with a previously received signal when compared to the signal characteristic associated with the newly received signal. As such, the processor 12 may determine an orientation associated with the increased signal characteristic and may operate the actuators to orient the electronic device to that orientation. The processor 12 may then return to block 114 to receive a signal from the communication hub 72.

At block 120 (YES path of block 116), in response to determining that the new signal characteristics meet or exceed signal characteristic threshold values, the processor 12 may send and/or receive data using the current orientation of the electronic device 10 relative to the communication hub 72. For example, the processor 12 may communicate with the communication hub 72 via the wireless communication network. In this manner, the method 100 may orient the electronic device 10 towards the communication hub 72 for improved communication performance, without user or manual interaction.

Figure 7:
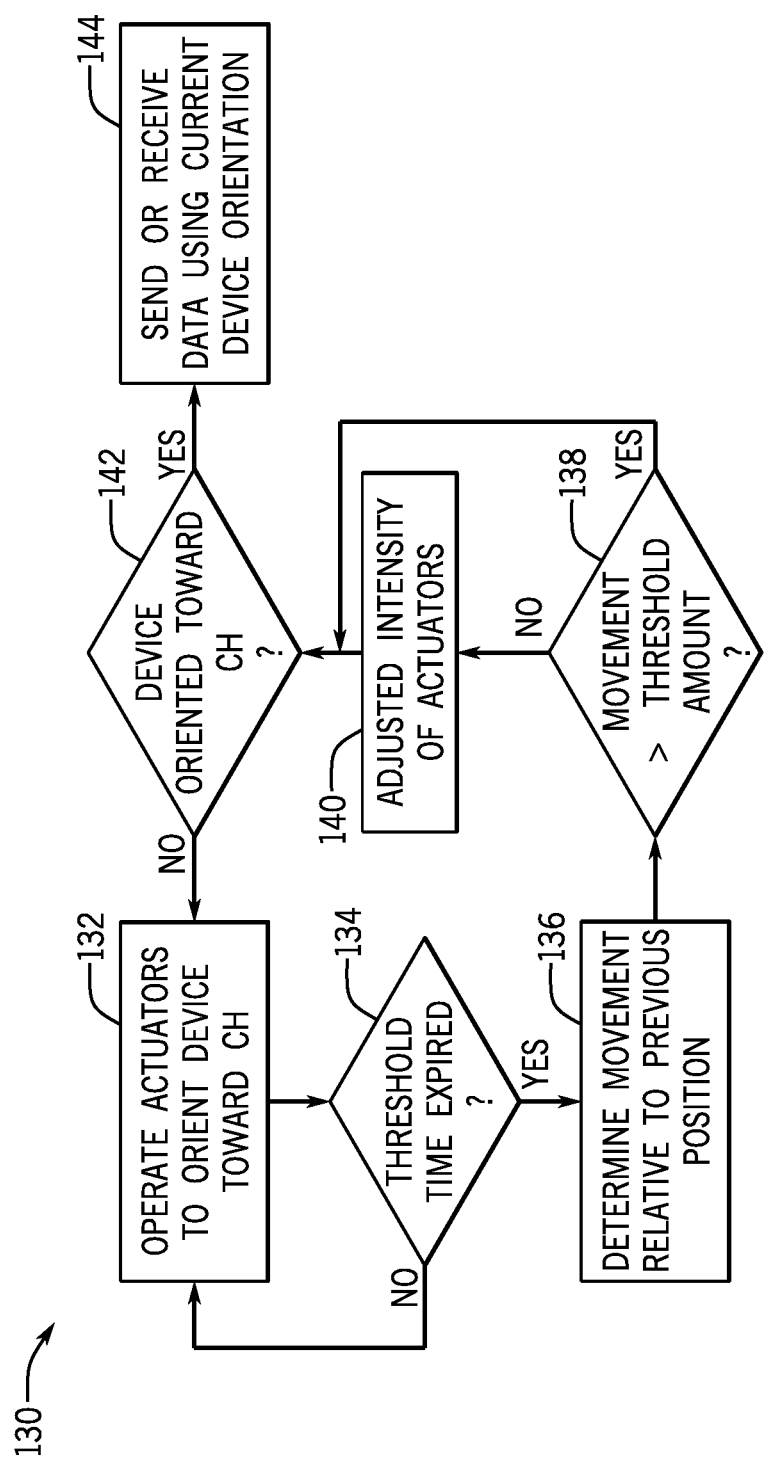
FIG. 7 is a flowchart of a method for adjusting operation of actuators of the electronic device of FIG. 1, according to embodiments of the present disclosure.

FIG. 7 is a flowchart of an embodiment of a method 130 for adjusting operation of actuators of the electronic device 10 of FIG. 1, according to embodiments of the present disclosure. At block 132, the processor 12 may operate actuators 62 of the electronic device 10 to orient the electronic device 10 towards the communication hub 72. At block 134, the processor 12 may determine whether a threshold time period has expired after beginning operation of the actuators 62. For example, the processor 12 may instruct the actuators 62 to operate for a threshold time period and may monitor the position and/or orientation of the electronic device 10 relative to the communication hub 72. The processor 12 may determine a starting position and/or orientation of the electronic device 10 and may determine an ending position and/or orientation after the expiration of the threshold time period. In response to determining that the threshold time period has not expired since beginning operation of the actuators 62, the processor 12 may return to block 132 to continue operation of the actuators 62.

At block 136 (YES path of block 134), in response to determining that the threshold time period has expired, the processor 12 may determine movement and/or rotation of the electronic device 10 relative to a previous position (e.g., a starting position and/or starting orientation). For example, the processor 12 may compare a current position and/or a current orientation to the previous position and/or orientation to determine the movement and/or rotation of the electronic device 10 (e.g., a distance moved from one or more reference points (such as one or more corners) of the electronic device 10, an angle of rotation of a reference axis (e.g., the lateral axis 64, the longitudinal axis 66, or both) of the electronic device 10, and so on). At block 138, the processor 12 may determine whether the movement satisfies a threshold movement amount and/or whether the rotation satisfies a threshold rotation amount. For example, the processor 12 may compare the determined movement to the threshold movement amount (e.g., 1 mm, 5 mm, 10 mm, and so forth) (e.g., with respect to one or more reference points of the electronic device 10) and/or may compare the determined rotation (e.g., with respect to one or more reference axes of the electronic device 10) to the threshold rotation amount (e.g., 5 degrees, 10 degrees, 20 degrees, 45 degrees, and so forth). At block 140 (NO path of block 138), in response to determining that the movement and/or the rotation fails to satisfy the threshold movement amount and/or the threshold rotation amount, the processor 12 may adjust the operation of the actuators 62. For example, the processor 12 may operate one or more additional actuators of the electronic device, may adjust (e.g., increase, decrease) an intensity of one or more actuators, may turn off one or more actuators, or any combination thereof.

At block 142, the processor 12 may determine whether the electronic device 10 is oriented towards the communication hub 72 based on the determined position of the communication hub 72. For example, the processor 12 may determine whether the antennas 55A-55N and/or the radiation pattern 74 is oriented towards the communication hub 72. Additionally or alternatively, the processor 12 may determine whether the orientation of the electronic device 10 relative to the communication hub 72 meets or exceeds a threshold angle. In response to determining that the orientation of the electronic device 10 relative to the communication hub 72 meets or exceeds the threshold angle (NO path of block 142), the processor 12 may return to block 132. At block 144 (YES path of block 142), in response to determining that the orientation of the electronic device 10 relative to the communication hub 72 falls within the threshold angle, the processor 12 may receive a signal from the communication hub 72. For example, the antennas 55A-55N may receive a signal from the communication hub 72 via the communication network and may transmit the signal to the processor 12. Additionally or alternatively, the processor 12 may send and/or receive data using the current orientation of the electronic device 10 relative to the communication hub 72. For example, the processor 12 may communicate with the communication hub 72 via the wireless communication network.

Figure 8:
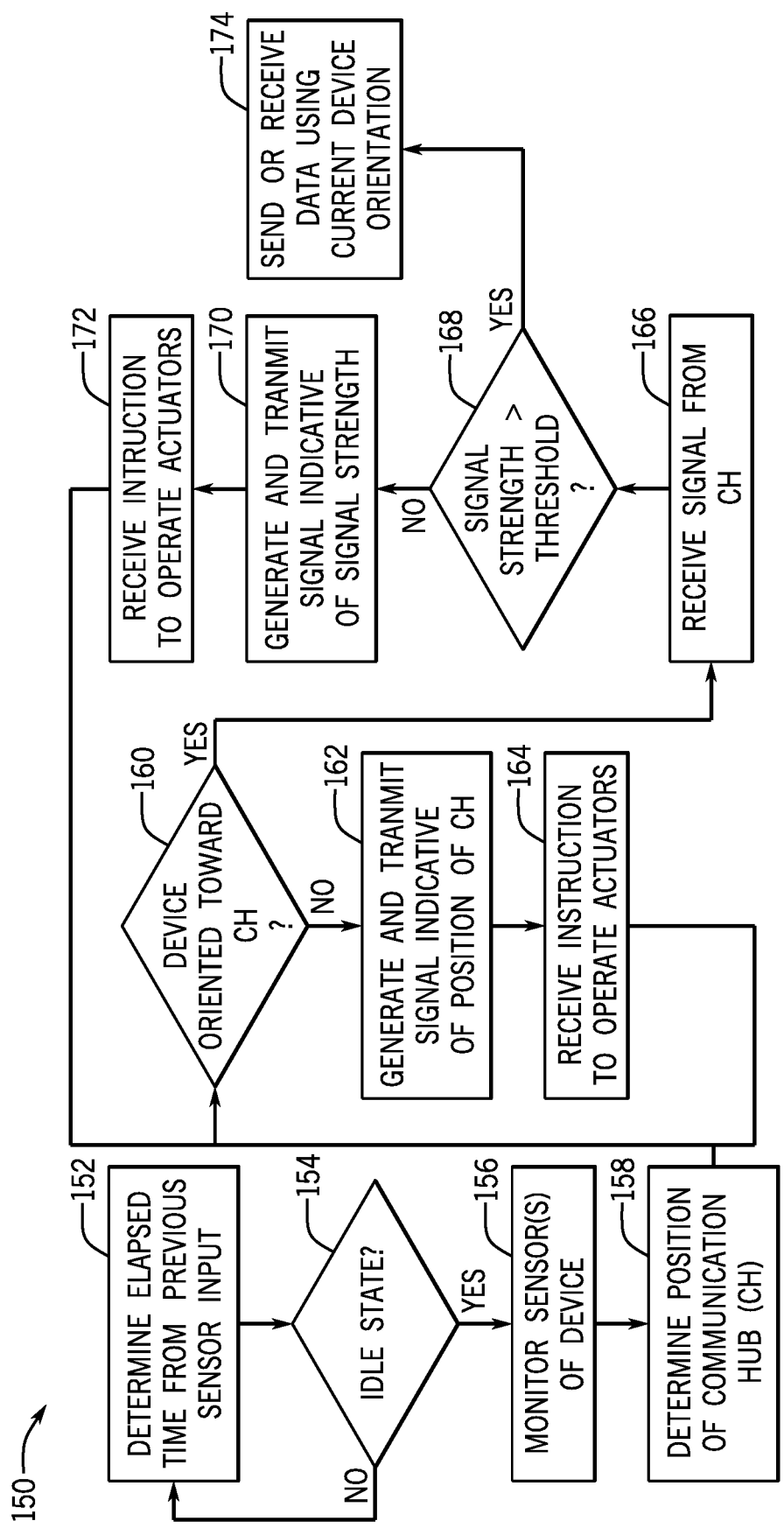
FIG. 8 is a flowchart of a method for operating the actuators of the electronic device of FIG. 1 via instructions received from the second electronic device of FIG. 5, according to embodiments of the present disclosure.

In certain instances, the electronic device 10 may be unreachable by a user. As such, the second electronic device 82 may generate and may transmit signals to the electronic device 10 and the signals may instruct the electronic device 10 to operate the actuators 62. FIG. 8 is a flowchart of an embodiment of a method 150 for operating the actuators 62 of the electronic device 10 of FIG. 1 via instructions received from the second electronic device 82 of FIG. 5, according to embodiments of the present disclosure. At block 152, the processor 12 may receive an elapsed time from a previous sensor input. For example, the processor 12 may determine the elapsed time from the previous sensor input. At block 154, the processor 12 may determine whether the electronic device 10 is in the idle state. In certain embodiments, the processor 12 may determine whether the elapsed time meets or exceeds a threshold time period. For example, the processor 12 may determine and/or may place the electronic device 10 in the idle state in response to determining that the elapsed time meets or exceeds the threshold time period. Alternatively, the processor 12 may determine and/or may place the electronic device in a non-idle state (e.g., an active state) in response to determining that the elapsed time falls below the threshold time period. At block 156 (YES path of block 154), in response to determining that the device is in the idle state, the processor 12 may monitor one or more sensors of the electronic device. By way of example, the processor 12 may cause the electronic device 10 to exit the idle state in response to receiving a sensor signal from any sensor of the one or more sensors. In response to determining that the device is not in the idle state (NO path of block 154), the processor 12 may return to block 152 to determine the elapsed time from the previous sensor input.

At block 158, the processor 12 may determine a position of the communication hub 72. For instance, the processor 12 may retrieve the CDN information from the memory 14 and may determine the position of the communication hub 72 based on the CDN information. At block 160, the processor 12 may determine whether the electronic device 10 is oriented towards the communication hub 72 based on the determined position of the communication hub 72. For example, the processor 12 may determine whether the antennas 55A-55N and/or the radiation pattern 74 is oriented towards the communication hub 72. Additionally or alternatively, the processor 12 may determine whether the orientation of the electronic device 10 relative to the communication hub 72 meets or exceeds a threshold angle. In response to determining that the orientation of the electronic device 10 relative to the communication hub 72 falls within the threshold angle (YES path of block 160), the processor 12 may continue to block 166. At block 162 (NO path of block 160), in response to determining that the orientation of the electronic device 10 relative to the communication hub 72 meets or exceeds the threshold angle, the processor 12 may generate and transmit a signal indicative of the position of the communication hub 72 and/or the orientation of the communication hub 72 relative to the electronic device 10. In certain embodiments, the electronic device 10 may transmit the signal to a second electronic device 82 and the signal may cause the second electronic device 82 to generate a user interface to display the position of the communication hub 72 and/or the orientation of the communication hub 72 relative to the electronic device 10.

At block 164, the processor 12 may receive an instruction to operate the actuators 62. In certain embodiments, the processor 12 may receive a signal from the second electronic device 82 that may cause the processor 12 to operate the actuators 62. That is, a user of the second electronic device 82 may use the user interface to operate the actuators 62 to orient the electronic device toward the communication hub 72. As such, the signal may instruct the processor 12 to operate the actuators 62 to orient the electronic device toward the communication hub 72. The processor 12 may then return to block 160 to determine whether the electronic device 10 is oriented towards the communication hub 72.

At block 166, the processor 12 may receive a signal from the communication hub 72. For example, the antennas 55A-55N may receive a signal from the communication hub 72 via the communication network and may transmit the signal to the processor 12. At block 168, the processor 12 may determine whether one or more signal characteristics associated with the received signal satisfy one or more signal characteristic threshold values. For example, the processor 12 may determine one or more signal characteristics for the received signal and may compare the one or more signal characteristics to corresponding signal characteristic threshold values. Additionally or alternatively, the processor 12 may compare signal characteristics of the received signal to stored signal characteristic values from previously received signals from the communication hub 72. For example, the processor 12 may receive any number of signals from the communication hub 72 during operation of the actuators, may process the previously received signals to generate corresponding signal characteristics, and may store the previously received signals and corresponding signal characteristics in the memory 14. The processor 12 may retrieve the stored signal characteristics from the memory 14 and may compare the stored signal characteristics with new signal characteristics associated with the received signal.

At block 170 (NO path of block 168), in response to determining that the new signal characteristics fall within the signal characteristic threshold values, the processor 12 may generate and transmit a signal indicative of the received signal (e.g., one or more signal characteristics) from the communication hub 72. In certain embodiments, the electronic device 10 may transmit the signal to the second electronic device 82 and the signal may cause the second electronic device 82 to generate a user interface to display one or more signal characteristics of the received signal from the communication hub 72. At block 172, the processor 12 may receive an instruction to operate the actuators 62. For example, the second electronic device 82 may store an associated orientation of the electronic device 10 relative to the communication hub 72 for previously received signals. Accordingly, the second electronic device 82 may compare signal characteristics associated with the previously received signals from the communication hub 72 to the signal characteristics associated with the newly received signal communication hub 72 and may determine an increased signal characteristic (e.g., a maximum signal characteristic, a peak signal characteristic) associated with a previously received signal when compared to the signal characteristic associated with the newly received signal. As such, the second electronic device 82 may determine an orientation associated with the increased signal characteristic and may instruct the electronic device 10 to operate the actuators to orient the electronic device to that orientation.

At block 174 (YES path of block 168), in response to determining that the new signal characteristics meet or exceed signal characteristic threshold values, the processor 12 may send and/or receive data using the current orientation of the electronic device 10 relative to the communication hub 72. For example, the processor 12 may communicate with the communication hub 72 via the wireless communication network. In this manner, the method 150 may enable operating the actuators 62 of the electronic device 10 of FIG. 1 via instructions received from the second electronic device 82 of FIG. 5, thus enabling operating the actuators 62 even when the electronic device 10 may be unreachable by a user.

Figure 9:
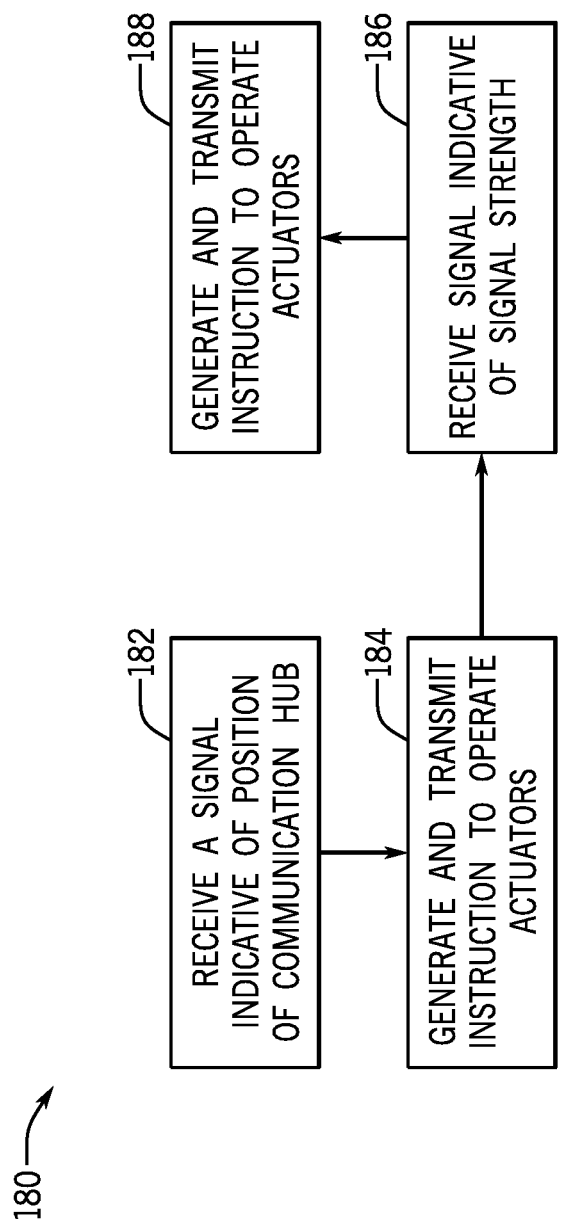
FIG. 9 is a flowchart of a method for operating the second electronic device of FIG. 8, according to embodiments of the present disclosure.

With the foregoing in mind, FIG. 9 is a flowchart for operating the second electronic device as referenced in FIG. 8, according to embodiments of the present disclosure. At block 182, the second electronic device 82 may receive a signal indicative of a position of the communication hub 72 and/or the orientation of the communication hub 72 relative to the electronic device 10. For example, the processor 12 may generate and transmit a signal indicative of the position of the communication hub 72 and/or the orientation of the communication hub 72 relative to the electronic device 10 and the second electronic device 82 may receive the signal. In certain embodiments, the signal may cause the second electronic device 82 to generate a user interface to display the position of the communication hub 72 and/or the orientation of the communication hub 72 relative to the electronic device 10.

At block 184, the second electronic device 82 may generate and transmit an instruction to operate actuators 62 of the electronic device 10 based on the position of the communication hub 72 and/or the orientation of the communication hub 72 relative to the electronic device 10. In certain embodiments, the second electronic device 82 may generate and/or may transmit a signal to the processor 12 that may cause the processor 12 to operate the actuators 62. That is, a user of the second electronic device 82 may use the user interface to operate the actuators 62 to orient the electronic device toward the communication hub 72. As such, the signal may instruct the processor 12 to operate the actuators 62 to orient the electronic device toward the communication hub 72.

Figure 10:
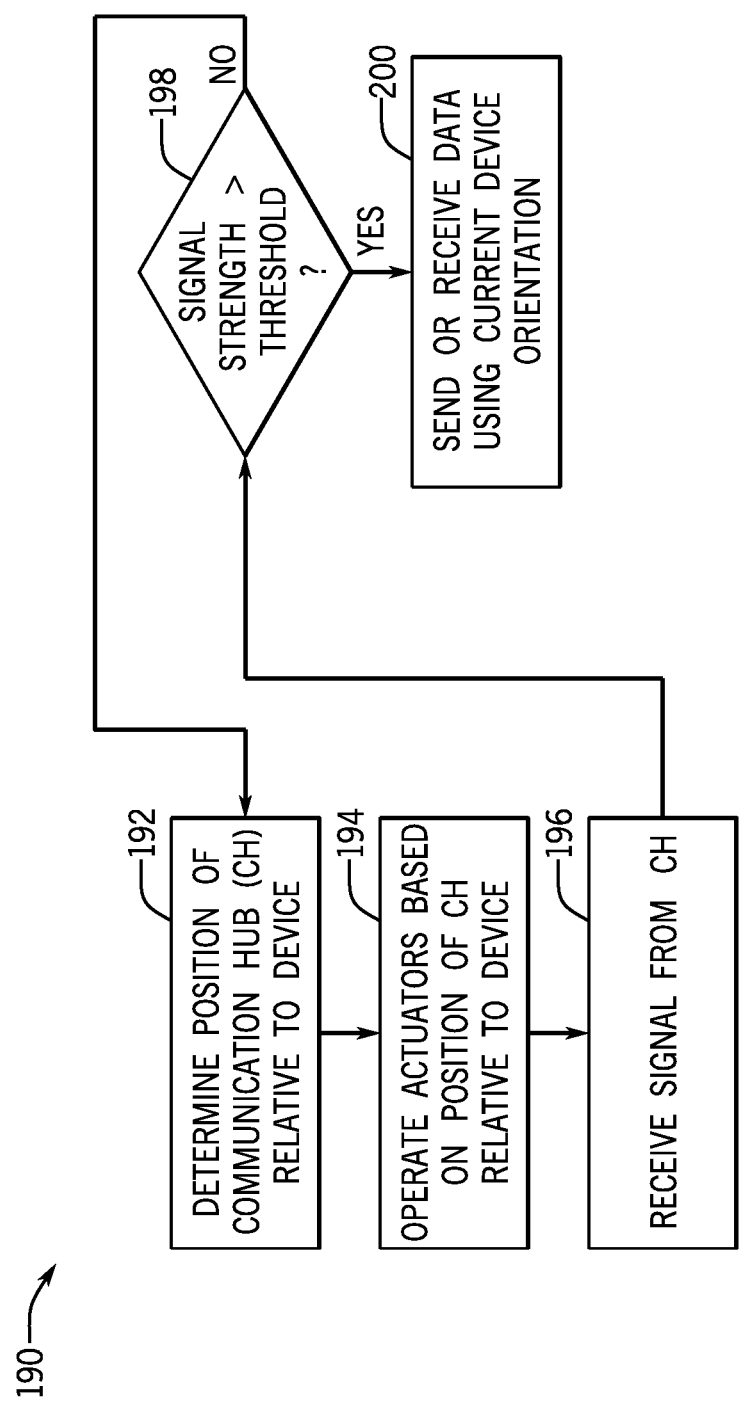
FIG. 10 is a flowchart of a method for orienting the electronic device of FIG. 1 when a display of the electronic device is inoperable, according to embodiments of the present disclosure.

At block 186, the second electronic device 82 may receive a signal indicative of a received signal (e.g., one or more signal characteristics) between the electronic device 10 and the communication hub 72. In certain embodiments, the electronic device 10 may transmit the signal to the second electronic device 82 and the signal may cause the second electronic device 82 to generate a user interface to display one or more signal characteristics of the received signal from the communication hub 72. At block 188, the second electronic device 82 may generate and/or may transmit an instruction to operate the actuators 62. For example, the second electronic device 82 may store an associated orientation of the electronic device 10 relative to the communication hub 72 for previously received signals. Accordingly, the second electronic device 82 may compare signal characteristics associated with the previously received signals from the communication hub 72 to the signal characteristics associated with the newly received signal communication hub 72 and may determine an increased signal characteristic (e.g., a maximum signal characteristic, a peak signal characteristic) associated with a previously received signal when compared to the signal characteristic associated with the newly received signal. As such, the second electronic device 82 may determine an orientation associated with the increased signal characteristic and may instruct the electronic device 10 to operate the actuators to orient the electronic device 10 to that orientation In some instances, the display 18 of the electronic device 10 may be cracked, broken, or otherwise inoperable. As such, the processor 12 may operate the actuators 62 to provide instructions to a user to adjust the orientation of the electronic device 10 relative to the communication hub 72. FIG. 10 is a flowchart of an embodiment of a method 190 for orienting the electronic device 10 of FIG. 1, according to embodiments of the present disclosure. At block 192, the processor 12 may determine a position of the communication hub 72. For instance, the processor 12 may retrieve the CDN information from the memory 14 and may determine the position of the communication hub 72 based on the CDN information. Additionally or alternatively, the processor 12 may determine whether the electronic device 10 is oriented towards the communication hub 72 based on the determined position of the communication hub 72. For example, the processor 12 may determine whether the antennas 55A-55N and/or the radiation pattern 74 is oriented towards the communication hub 72. Additionally or alternatively, the processor 12 may determine whether the orientation of the electronic device 10 relative to the communication hub 72 meets or exceeds a threshold angle. In response to determining that the orientation of the electronic device 10 relative to the communication hub 72 falls within the threshold angle, the processor 12 may operate the actuators 62 in a corresponding pattern (e.g., pulses, long steady vibration) to provide an indication that the electronic device is oriented towards the communication hub 72.

In response to determining that the orientation of the electronic device 10 relative to the communication hub 72 meets or exceeds the threshold angle, the processor 12 may continue to block 194. At block 194, the processor 12 may operate the actuators 62 based on the position of the communication hub 72 relative to the electronic device 10. In certain embodiments, the processor 12 may operate one or more actuators to provide an indication of the position of the communication hub 72 relative to the electronic device 10. For example, the processor 12 may operate a first actuator on a first lateral side of the electronic device 10 to provide an indication to rotate (e.g., adjust a yaw of the electronic device 10) the electronic device 10 in a first direction (e.g., clockwise). If a user is holding the electronic device 10, then the user may feel the indication to rotate the electronic device 10 from the first actuator of the first lateral side of the electronic device 10, and know to rotate the electronic device 10 in the first direction. As another example, the processor 12 may operate a second actuator on a second lateral side of the electronic device to provide an indication to rotate (e.g., adjust the yaw of the electronic device 10) the electronic device 10 in a second direction (e.g., counterclockwise). If a user is holding the electronic device 10, then the user may feel the indication to rotate the electronic device 10 from the second actuator of the second lateral side of the electronic device 10, and know to rotate the electronic device 10 in the second direction. As yet another example, the processor 12 may operate a third actuator on a first longitudinal side of the electronic device to provide an indication to rotate (e.g., adjust a pitch of the electronic device 10) the electronic device 10 in a third direction (e.g., pitch up). If a user is holding the electronic device 10, then the user may feel the indication to rotate the electronic device 10 from the third actuator of the first longitudinal side of the electronic device 10, and know to rotate the electronic device 10 in the third direction. As another example, the processor 12 may operate a fourth actuator on a second longitudinal side of the electronic device 10 to provide an indication to rotate (e.g., adjust the pitch of the electronic device 10) the electronic device 10 in a fourth direction (e.g., pitch down), or any combination thereof. If a user is holding the electronic device 10, then the user may feel the indication to rotate the electronic device 10 from the fourth actuator of the second longitudinal side of the electronic device 10, and know to rotate the electronic device 10 in the fourth direction. It should be understood that any or all of these examples may be combined in a single indication.

At block 196, the processor 12 may receive a signal from the communication hub 72. For example, the antennas 55A-55N may receive a signal from the communication hub 72 via the communication network and may transmit the signal to the processor 12.

At block 198, the processor 12 may determine whether one or more signal characteristics associated with the received signal satisfy one or more signal characteristic threshold values. For example, the processor 12 may determine one or more signal characteristics for the received signal and may compare the one or more signal characteristics to corresponding signal characteristic threshold values. Additionally or alternatively, the processor 12 may compare signal characteristics of the received signal to stored signal characteristic values from previously received signals from the communication hub 72. For example, the processor 12 may receive any number of signals from the communication hub 72 during operation of the actuators, may process the previously received signals to generate corresponding signal characteristics, and may store the previously received signals and corresponding signal characteristics in the memory 14. The processor 12 may retrieve the stored signal characteristics from the memory 14 and may compare the stored signal characteristics with new signal characteristics associated with the received signal. In response to determining that the new signal characteristics fall within the signal characteristic threshold values (NO path of block 198), the processor 12 may return to block 192.

At block 200 (YES path of block 198), in response to determining that the new signal characteristics meet or exceed signal characteristic threshold values, the processor 12 may send and/or receive data using the current orientation of the electronic device 10 relative to the communication hub 72. For example, the processor 12 may communicate with the communication hub 72 via the wireless communication network. In this manner, the method 180 may enable the processor 12 to operate the actuators 62 to provide instructions to a user to adjust the orientation of the electronic device 10 relative to the communication hub 72, which may enable better communication performance with the communication hub 72, even if the display 18 of the electronic device 10 is cracked, broken, or otherwise inoperable.

Embodiments of the present disclosure are directed to operating a mobile communicating device to communicate (e.g., transmit, receive) data. In response to determining a position of a communication hub of a wireless communication network, the mobile communicating device may operate one or more actuators to move the device to adjust the orientation of the device relative to the communication hub. As such, the mobile communicating device may adjust the orientation of the device relative to the communication hub to provide more reliable and/or more efficient communication of data.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]..." or "step for [perform]ing [a function]....," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving a position of a communication hub;
receiving an indication of an orientation of one or more antennas of a device relative to the communication hub based on the position of the communication hub; and
operating, based on the orientation of the one or more antennas, a haptic actuator of the device to move the device to adjust the orientation of the one or more antennas relative to the communication hub.

2. The method of claim 1, wherein operating the haptic actuator to move the device causes the one or more antennas to be disposed in a subsequent orientation relative to the communication hub, the method comprising adjusting operation of the haptic actuator of the device based on the subsequent orientation.

3. The method of claim 2, wherein adjusting operation of the haptic actuator of the device comprises altering an intensity of the haptic actuator of the device based on the subsequent orientation.

4. The method of claim 1, wherein operating the haptic actuator to move the device causes the one or more antennas to be disposed in a subsequent orientation relative to the communication hub, the method comprising operating a second haptic actuator of the device based on the subsequent orientation.

5. The method of claim 4, comprising adjusting operation of the haptic actuator, the second haptic actuator, or both, of the device based on the subsequent orientation.

6. The method of claim 5, wherein adjusting operation of the haptic actuator, the second haptic actuator, or both, of the device comprises ceasing operation of the haptic actuator, the second haptic actuator, or both, of the device.

7. One or more non-transitory computer-readable media comprising instructions that, when executed by processing circuitry, are configured to cause the processing circuitry to:
   receive an elapsed time from receiving a previous input from a sensor of a device;
   cause the device to enter an idle state based on the elapsed time meeting or exceeding a threshold time period; and
   in response to causing the device to enter the idle state,
      receive a position of a communication hub,
      receive an orientation of one or more antennas of the device relative to the communication hub based on the position of the communication hub, and
      operate an actuator of the device to move the device to adjust the orientation of the one or more antennas relative to the communication hub.

8. The one or more non-transitory computer-readable media of claim 7, wherein the instructions, when executed by the processing circuitry, are configured to cause the processing circuitry to receive a signal from the communication hub via the one or more antennas and determine a signal characteristic of the signal.

9. The one or more non-transitory computer-readable media of claim 8, wherein the instructions, when executed by the processing circuitry, are configured to cause the processing circuitry to compare the signal characteristic to a threshold signal characteristic.

10. The one or more non-transitory computer-readable media of claim 9, wherein the instructions, when executed by the processing circuitry, are configured to cause the processing circuitry to operate the actuator of the device to move the device to adjust the orientation of the one or more antennas relative to the communication hub based on the signal characteristic being less than the threshold signal characteristic.

11. The one or more non-transitory computer-readable media of claim 9, wherein the instructions, when executed by the processing circuitry, are configured to cause the processing circuitry to determine an estimated orientation of the one or more antennas relative to the communication hub, the estimated orientation being associated with an increased or maximum signal characteristic based on the signal received from the communication hub.

12. The one or more non-transitory computer-readable media of claim 11, wherein the instructions, when executed by the processing circuitry, are configured to cause the processing circuitry to operate the actuator of the device to move the device to adjust the orientation of the one or more antennas toward the estimated orientation.

13. The one or more non-transitory computer-readable media of claim 7, wherein the instructions, when executed by the processing circuitry, are configured to cause the processing circuitry to receive a subsequent input from the sensor of the device based on the device entering the idle state, and cease operation of the actuator based on the subsequent input.

14. The one or more non-transitory computer-readable media of claim 7, wherein the instructions, when executed by the processing circuitry, are configured to cause the processing circuitry to determine a subsequent orientation of the one or more antennas of the device relative to the communication hub and adjust operation of the actuator of the device based on the subsequent orientation.

15. A method comprising:
   receiving a position of a communication hub;
   receiving an orientation of one or more antennas of a device relative to the communication hub based on the position of the communication hub;
   generating and transmitting a first signal via the one or more antennas indicative of the position of the communication hub, the orientation of the one or more antennas of the device relative to the communication hub, or both;
   receiving a second signal to operate an actuator of the device; and
   operating the actuator of the device based on the second signal.

16. The method of claim 15, wherein the first signal instructs a second device to generate a graphical user interface indicative of the position of the communication hub, the orientation of the one or more antennas, or both.

17. The method of claim 15, wherein operating the actuator of the device causes the one or more antennas to be disposed in a subsequent orientation relative to the communication hub, the method comprising receiving the subsequent orientation of the one or more antennas relative to the communication hub, and generating and transmitting a third signal indicative of the subsequent orientation of the one or more antennas, wherein the third signal is configured to instruct a second device to generate a graphical user interface indicative of the subsequent orientation based on the third signal.

18. The method of claim 15, comprising receiving a third signal via the one or more antennas to adjust operation of the actuator of the device.

19. The method of claim 18, comprising altering an intensity of the actuator based on the third signal.

20. The method of claim 15, comprising receiving a third signal from the communication hub via the one or more antennas, receiving a signal characteristic of the third signal, and generating and transmitting a fourth signal based on the signal characteristic.

* * * * *